United States Patent
Thomas et al.

[11] 4,285,044
[45] Aug. 18, 1981

[54] DIGITAL GENERATOR FOR PRODUCING A SINEWAVE

[75] Inventors: Luc Thomas, Paris; Claude Cardot, Gif-sur-Yvette, both of France

[73] Assignee: Compagnie Industrielle des Telecommunications Cit-Alcatel, Paris, France

[21] Appl. No.: 56,668

[22] Filed: Jul. 11, 1979

[30] Foreign Application Priority Data

Jul. 13, 1978 [FR] France .................. 78 21006

[51] Int. Cl.$^3$ .............................................. G06F 1/02
[52] U.S. Cl. ...................................... 364/721; 328/14
[58] Field of Search ............... 364/721, 817; 328/14, 328/142, 178

[56] References Cited

U.S. PATENT DOCUMENTS

| | | | |
|---|---|---|---|
| 3,649,821 | 3/1972 | Gumacos | 364/721 X |
| 3,679,881 | 7/1972 | Gondeck | 364/721 |
| 4,159,526 | 6/1979 | Mosley, Jr. et al. | 364/721 |
| 4,172,286 | 10/1979 | Wess | 364/721 |

*Primary Examiner*—David H. Malzahn
*Attorney, Agent, or Firm*—Sughrue, Rothwell, Mion, Zinn and Macpeak

[57] ABSTRACT

A digital sinewave generator can be used in digital equipment, e.g. instead of a local oscillator for modulation/demodulation of signals. If there is no simple relationship between sampling rate and the frequency of the sinewave, successive sample values must be calculated since storage of these values would be prohibitive. For a sinewave $Re^{jk\phi}$ sampled at successive instants $k=0, 1, 2, \ldots$ etc. separated by a phase angle $\phi$, quadrature components $A_k + jB_k = Re^{jk\phi}$ can be calculated using the algorithm:

$$A_{k+1} = \cos\phi A_k - \sin\phi B_k$$

$$B_{k+1} = \sin\phi A_k + \cos\phi B_k.$$

Unfortunately it is impossible for $\cos^2\phi + \sin^2\phi$ to be exactly equal to unity if calculations are performed with finite precision using an even number base, which as the effect of causing the modulus of a sinewave generated by this algorithm to tend exponentially to 0 to $\infty$. The present invention overcomes this by using the above algorithm to obtain approximations $A_{k+1}'$ and $B_{k+1}'$ to the desired result at terminals (9 and 10) and then multiplying (22,23) the approximations $A_{k+1}'$ and $B_{k+1}'$ by a correction factor $(1-\tfrac{1}{2}\epsilon)$ to obtain better approximations $A_{k+1}$ and $B_{k+1}$ which are stable about the desired amplitude R.

$$\epsilon = \frac{1}{R^2}(A'^2_{k+1} + B'^2_{k+1}).$$

Such a generator can be used as a local oscillator in a modem for example.

9 Claims, 3 Drawing Figures

4,285,044

DIGITAL GENERATOR FOR PRODUCING A SINEWAVE

BACKGROUND OF THE INVENTION

This invention relates to a digital generator for producing a sinewave in the form of a succession of digitally encoded samples.

Digital generators may be used in digital equipment as substitutes for analogue oscillators. An example of such equipment is a modulator/demodulator (modem) for sending and receiving digitally encoded data via telephone lines, i.e via a transmission medium with a bandwidth limited to about 3 kHz. Various complex modulation techniques have been devised to enable high rates of data transmission via telephone lines in spite of the limited bandwidth, e.g. the CCITT recommendation V29 for data transmission at a rate of 9,600 bits/sec. These modulation techniques are more easily performed using digital circuits than analogue circuits, and it is therefore convenient to generate sinewaves for modulation or demodulation in a form directly suitable for digital processing.

In some circumstances it is possible to generate a succession of samples of a sinewave simply by looking up values in a table. For example, if the sinewave is generated in the form of samples at successive 90° phase intervals, only the values +1,0,−1 and 0 need be stored. Further, multiplication by such numbers is very simple. In other circumstances, no such easy relationship exists between the sampling rate and the frequency desired for the generated sinewave, in which case sample values need to be calculated each time they are required since storage of enough sample values to sufficient accuracy becomes prohibitively expensive.

A known digital generator calculates successive digitally encoded sample values of a sinewave of amplitude R, with a sampling period T corresponding to a phase difference $\phi$ between two successive samples, by performing the following algorithm:

$$A_{k+1} = aA_k - bB_k$$

$$B_{k+1} = bA_k + aB_k$$

where $a = \cos \phi$, $b = \sin \phi$, $A_o = R$ and $B_o = 0$, $k = 0, 1, 2, \ldots$ and the sinewave is defined at the instant k by the vector sum $A_k + jB_k = Re^{jk\phi}$.

By substituting values into the equations of the algorithm above it can be seen that it is based on the trigonometric identities:

R cos $(k+1)\phi$ = R cos $\phi$ cos k $\phi$ − R sin $\phi$ sin k$\phi$

R sin $(k+1)\phi$ = R sin $\phi$ cos k$\phi$ + R cos $\phi$ sin k$\phi$

FIG. 1 of the accompanying drawings is a block diagram of such a generator. It comprises two delay lines 1 and 2 (e.g. buffer storage registers) providing a delay equal to T, two adders 3 and 4, two multipliers 5 and 8 and two outputs 9 and 10. Further, the figure shows two sources 11 and 12 (e.g. registers) for storing respective constants, and means 13 and 14 for initializing the generator with values $A_O = 1$ and $B_O = 0$, (i.e. in this case R = 1). The sources 11 and 12 are each connected to two multipliers (6 and 7, and 5 and 8 respectively) and they supply constant sin $\phi$ and cos $\phi$ values respectively.

The multipliers also receive in pairs the signals delivered by the respective delay lines 1 and 2. Each of the adders 3 and 4 sums values from a pair of multipliers connected to receive different constants. Thus the adder 3 is connected to the outputs of the multipliers 5 and 7, while the adder 4 is connected to the outputs of the multipliers 6 and 8. The outputs of the adders are connected to respective ones of the outputs 9 and 10 as well as to the input of the corresponding delay line 1 or 2.

To explain the operation of this generator, let a = cos $\phi$ b = sin $\phi$ where $\phi$ is the phase difference between two successive samples of the sinewave to be produced.

Initialize the generator with $A_o = 1$ and $B_o = 0$, and assume, for the moment, that its calculating and data storage units have infinite precision. The generator will then produce successive samples of the wave:

$$A_k + jB_k = e^{jk\phi}$$

where $A_k = \cos k\phi$, $B_k = \sin k\phi$, and k = 0, 1, 2, …

It can be observed that the amplitude of the wave is constant and equal to unity.

To obtain a wave of any desired amplitude and A and B samples may be post-multiplied by the desired amplitude value.

Now, for the digital generator shown in FIG. 1, if calculation errors, and in particular truncation errors, are to be taken into account, and if an even number is used as the number base for calculation, the following identity:

$$a^2 + b^2 = 1$$

can no longer be exactly true.

The result of this is that the amplitude of the wave delivered by the generator cannot remain stable.

The algorithm performed in FIG. 1 is:

$$A_{k+1} = aA_k - bB_k$$

$$B_{k+1} = bA_k + aB_k,$$

from which it can be deduced:

$$A_{k+1}^2 + B_{k+1}^2 = (A_k^2 + B_k^2)(a^2 + b^2).$$

Taking the initialization into account, $$A_k^2 + B_k^2 = (a^2 + b^2)^k,$$

which indicates that the amplitude of the wave produced will tend exponentially towards infinity or zero depending on whether $(a^2 + b^2)$ is greater than or less than unity.

SUMMARY OF THE PRESENT INVENTION

The aim of the present invention is to mitigate this drawback and to provide a digital generator which is less sensitive to such cumulative error.

The present invention provides a digital generator for producing a sinewave in the form of a succession of digitally encoded samples produced with a sampling period T, the sinewave having an amplitude R and a phase difference $\phi$ between two successive samples, the generator comprising adding means, multiplying means and storage means for performing the following general algorithm:

$$A_{k+1} = aA_k - bB_k$$

$$B_{k+1} = bA_k + aB_k$$

where $a = \cos \phi$, $b = \sin \phi$, $A_o = R$ and $B_o = 0$, $k = 0, 1, 2, \ldots$ and the sinewave being defined at the instant k by the vector sum $A_k + jB_k = Re^{jk\phi}$, wherein the precise algorithm is the following:

$$A_{k+1} = (aA_k - bB_k)(1 - \tfrac{1}{2}\epsilon_{k+1})$$
$$B_{k+1} = (bA_k + aB_k)(1 - \tfrac{1}{2}\epsilon_{k+1})$$
where
$$\epsilon_{k+1} = \frac{1}{R^2}(aA_k - bB_k)^2 + \frac{1}{R^2}(bA_k + aB_k)^2 - 1$$

This correction converges rapidly making it possible to stabilize the amplitude on the desired value.

A preferred embodiment of the invention comprises a digital generator for producing a sinewave in the form of a succession of digitally encoded sample values $A_k$ and $B_k$ at successive instants $k = 0, 1, 2, \ldots$ regularly separated by periods T, such that $A_k + jB_k = Re^{jk\phi}$, where R is the amplitude of the sinewave and $\phi$ is its phase difference between two successive samples, the generator comprising:

primary calculation means including two registers for storing the current values of $A_k$ and $B_k$, two registers for storing constants a and b such that $a = \cos \phi$ and $b = \sin \phi$, multiplying means for calculating the products: $aA_k$, $bA_k$, $aB_k$ and $bB_k$, and adding and subtracting means for calculating approximations $A'_{k+1}$ and $B'_{k+1}$ to the next sample values $A_{k+1}$ and $B_{k+1}$ where:

$$A'_{k+1} = aA_k - bB_k$$

$$B'_{k+1} = bA_k + aB_k;$$

correction factor calculation means arranged to receive the approximations $A'_{k+1}$ and $B'_{k+1}$ and including multiplying/dividing means and adding/subtracting means to calculate a correction factor $(1 - \tfrac{1}{2}\epsilon_{k+1})$ therefrom, where $\epsilon_{k+1} = \dfrac{1}{R^2}(A'^2_{k+1} + B'^2_{k+1}) - 1$;

multiplication means arranged to receive the said correction factor and the approximations $A'_{k+1}$ and $B'_{k+1}$ to calculate the next sample values:

$$A_{k+1} = A'_{k+1}(1 - \tfrac{1}{2}\epsilon_{k+1})$$
$$B_{k+1} = B'_{k+1}(1 - \tfrac{1}{2}\epsilon_{k+1}); \text{ and}$$

means for replacing the previous sample values by the next sample values in the said storage means for storing the previously calculated sample values in order to begin a further cycle of calculation; said primary calculation means being associated with initialization means for ensuring that the modulus of the starting values $A_o$ and $B_o$ is greater than 0 and not greater than $R\sqrt{5}$.

DETAILED DESCRIPTION OF THE PRESENT INVENTION

Two embodiments of the invention are described below in more detail with reference to the block diagrams of FIGS. 2 and 3 respectively of the accompanying drawings.

Figure 1:
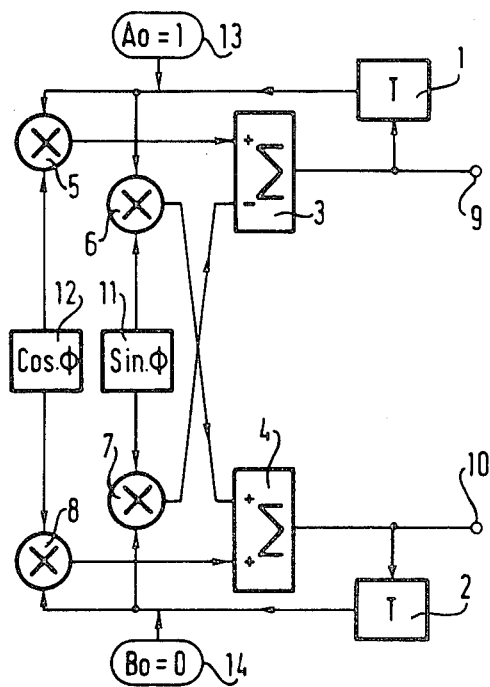
FIG. 1 is a block diagram of a prior art digital sinewave generator.
Figure 2:
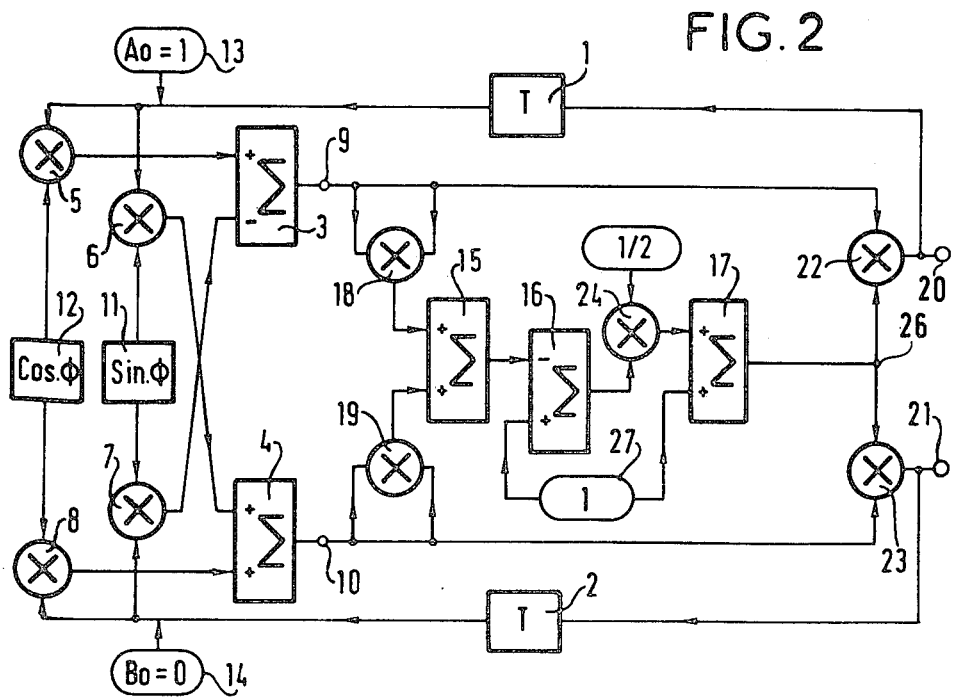
FIG. 2 is a block diagram of the digital sinewave generator in accordance with a first embodiment of the present invention.

FIG. 2 shows a generator in accordance with the invention in which primary calculation means are substantially identical with the prior art generator shown in FIG. 1 and comprise components that have the same reference numerals. It can be seen that the delay lines 1 and 2 are no longer supplied directly from the respective outputs 9 and 10 of the pair of adders 3 and 4, but instead they are supplied from the outputs of respective supplementary multipliers 22 and 23, whose inputs are connected firstly to receive the value present on respective ones of the outputs 9 and 10, and secondly to receive a correction value present on a terminal 26. The outputs 20 and 21 of these two multipliers constitute the outputs of the generator and supply the values $A_{k+1}$ and $B_{k+1}$, and it is these values which are applied to the inputs of the delay lines 1 and 2 respectively.

In noting the non-corrected i.e. approximate values supplied by the adders 3 and 4 as A' and B' respectively, and because of truncation and the errors associated with digital calculation, $A'^2 + B'^2 = 1 + \epsilon$, where $\epsilon \neq 0$, and may be positive or negative. From which it follows, in order to obtain A and B such that they are components of a wave of unit amplitude, i.e. such that
$A^2 + B^2 = 1$,
$A = (1+\epsilon)^{-\frac{1}{2}} \cdot A'$
$B = (1+\epsilon)^{-\frac{1}{2}} \cdot B'$ To simplify implementation, a first order approximation to the correction factor is chosen using Newton's formula, i.e.:

$$(1+\epsilon)^{-\frac{1}{2}} \approx 1 - \tfrac{1}{2}\epsilon$$

The means for calculating the correction factor $(1 - \tfrac{1}{2}\epsilon)$ shown in FIG. 2 comprises three adders 15, 16 and 17 and two multipliers 18 and 19. One of the multipliers receives the value $A'_{k+1}$ (output 9) on both its inputs and the other receives the value $B'_{k+1}$ (output 10) on both its inputs. The output of the multiplier 18 thus provides the value $A'^2_{k+1}$ which is applied together with the value $B'^2_{k+1}$ to the first adder 15. This adder is followed by a second adder which receives the value ONE, and which provides the value:

$$1 - (A'^2_{k+1} + B'^2_{k+1}) = 1 - (1 + \epsilon) = -\epsilon$$

This value is divided by 2 using a multiplier 24 (i.e. multiplication by $\tfrac{1}{2}$) and it is then applied to the third adder 17 which adds unity thereto.

It can be easily deduced that the numerical value at the output of the adder 17 is identical to the approximate correction factor:

$(1-\frac{1}{2}\epsilon_{k+1})$

By multiplying this approximate correction factor with the values $A_{k+1}'$ and $B_{k+1}'$ in the multiplier 22 and 23, values A and B are obtained such that:

$$A_{k+1}^2 + B_{k+1}^2 = 1 - \tfrac{3}{4}\epsilon_{k+1}^2 + \tfrac{1}{4}\epsilon_{k+1}^3$$

It can be proved that the algorithm defined by these correction equations converges rapidly and that it therefore provides amplitude stability in the output wave, even in the presence of large calculation errors and regardless of the source of errors. If the amplitude of the output wave lies between 0 and $\sqrt{5}$, each error is less than the square of the preceding error, i.e. there is exponential convergence at twice the calculation rate.

Figure 3:
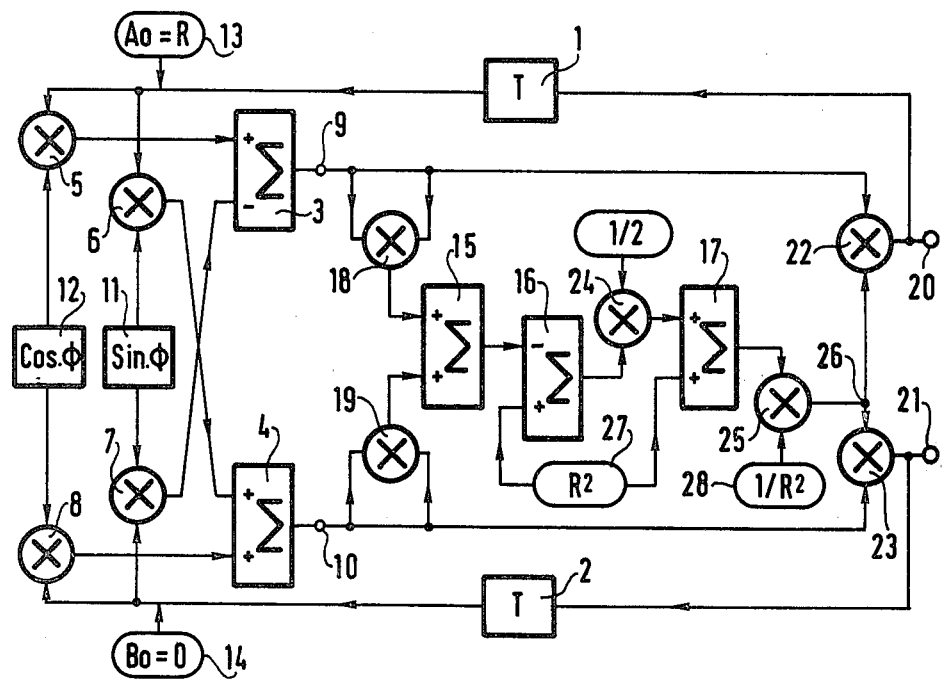
FIG. 3 is a block diagram of a digital sinewave generator in accordance with a second embodiment of the present invention.

While the digital generator shown in FIG. 2 provides a wave of unit amplitude, FIG. 3 shows, in contrast, an embodiment of the invention which provides a sinewave of any desired amplitude R. This embodiment avoids the necessity of post-multiplication of an output value when it is desired to obtain a wave of amplitude other than unity.

In this embodiment, the generator is initialized using:
$A_o = R$, and
$B_o = 0$.

The ideal waves as would be provided in the absence of any error and any correction, would be: $A + jB = R \cdot e^{jk\phi}$.

The generator shown in this figure includes all the elements 1 to 24 of the preceding figure in the same arrangement. However, the adders 16 and 17 do not receive the value 1 as before, but the value $R^2$ from a source 27. Between the output of the adder 17 and the point 26 a further multiplier 25 is inserted, which receives the value $1/R^2$ from a constant source 28. These modifications are sufficient to supply the correction factor $(1-\frac{1}{2}\epsilon_{k+1})$ at the point 26 for the case where the amplitude is R, the error being such that:

$$\epsilon_{k+1} = \frac{1}{R^2}(aA_k - bB_k)^2 + \frac{1}{R^2}(bA_k + aB_k)^2 - 1$$

In this case the algorithm converges provided the amplitude lies between 0 and $R\sqrt{5}$.

By way of concrete example, the Applicants' presently preferred embodiment of the present invention is a FIG. 2 embodiment used in a modem for demodulation of 9,600 bits/sec signals encoded on a nominal 1,700 Hz carrier according to CCITT recommendation V29. A local carrier frequency wave is generated in the form of a succession of sine and cosine values encoded in twos complement 16-bit words using 2900 series "sliced" microprocessor with a hard wired program. The actual received carrier frequency is measured during an initialization period and may lie anywhere in the range 1,700 Hz±12 Hz (which is a somewhat wider tolerance than laid down by the CCITT) and the local carrier frequency is adjusted to match the received frequency. Sampling is at a frequency of 4,800 Hz (i.e. at $208\frac{1}{3}$ µs intervals) giving a value of $\phi$ lying in the range 127.5°±0.8°. For any one reception run the values of the constants a and b ($\cos \phi$ and $\sin \phi$) remain fixed at the value appropriate to the initially measured received frequency, and thereafter small drifts (less than ±1 Hz) in received frequency are compensated by a self adaptive equalizer.

Naturally the invention is applicable to other situations where digitally encoded values of successive samples of a sine-wave may be required, and where hardware exists that is fast enough e.g. for digital processing of signals in a PCM system. Separate units can be used for each operation as shown in the block diagrams instead of using a processor to perform the operations sequentially as outlined above. Only the real part A of the sineware may be of interest in some situations. In this case the output 21 is not used externally to the generator, although the imaginary component is still calculated for internal use.

We claim:

1. A digital generator for producing a sinewave in the form of a succession of digitally encoded samples produced with a sampling period T, the sinewave having an amplitude R and a phase difference $\phi$ between two successive samples, the sinewave at time k defined by the vector sum $A_k + jB_k = Re^{jk\phi}$ the generator comprising:

means for generating signals $a = \cos \phi$, $b = \sin \phi$, $A_k$, $B_k$ at time k, where $A_o = R$ and $B_o = 0$ at time 0;

first signal processing means (5, 7, 3, 6, 8, 4) for combining said signals a, b, $A_k$ and $B_k$ for providing signals $aA_k - bB_k$, and $bA_k + aB_k$, at time k;

second signal processing means (18, 19, 15, 16, 27) responsive to said first signal processing means for providing a signal proportional to $$\epsilon_{k+1} = \frac{1}{R^2}(aA_k - bB_k)^2 + \frac{1}{R^2}(bA_k + aB_k)^2 - 1$$

at time k; and third signal processing means (24, 17, 25, 22, 23) responsive to said second signal processing means for providing signals $A_{k+1} = (aA_k - bB_k)(1 - \tfrac{1}{2}\epsilon_{k+1})$, and
   $B_{k+1} = (bA_k + aB_k)(1 - \tfrac{1}{2}\epsilon_{k+1})$, at time k.

2. A generator according to claim 1, wherein $R = 1$.

3. A digital generator for producing a sinewave in the form of a succession of digitally encoded sample values $A_k$ and $B_k$ at successive instants $k = 0, 1, 2, \ldots$ regularly separated by periods T, such that $A_k + jB_k = Re^{jk\phi}$, where R is the desired amplitude of the sinewave and $\phi$ is its phase difference between two successive samples, the generator comprising:

primary calculation means including two registers (1, 2) for storing the current values of $A_k$ and $B_k$, two registers for storing constants a and b (12, 11) such that $a = \cos \phi$ and $b = \sin \phi$, multiplying means (5, 6, 8, 7) connected to said two registers storing $A_k$ and $B_k$ and said two registers storing a and b for calculating the products: $aA_k$, $bA_k$, $aB_k$ and $bB_k$, and adding and subtracting means (3, 4) connected to said multiplying means for calculating approximations $A'_{k+1}$ and $B'_{k+1}$ to the next sample values $A_{k+1}$ and $B_{k+1}$ where:

$A'_{k+1} = aA_k - bB_k$ $B'_{k+1} = bA_k + aB_k$;

correction factor calculation means arranged to receive the approximations $A'_{k+1}$ and $B'_{k+1}$ and including multiplying/dividing means (18, 19, 24, 25) and adding/subtracting means (15, 16, 17) to calculate a correction factor $(1-\frac{1}{2}\epsilon_{k+1})$ therefrom, where $$\epsilon_{k+1} = \frac{1}{R^2}(A'^2_{k+1} + B'^2_{k+1}) - 1;$$

multiplication means (22, 23) arranged to receive said correction factor and the approximations $A'_{k+1}$ and $B'_{k+1}$ to calculate the next sample values:

$$A_{k+1} = A'_{k+1}(1 - \frac{1}{2}\epsilon_{k+1})$$
$$B_{k+1} = B'_{k+1}(1 - \frac{1}{2}\epsilon_{k+1});$$

means for replacing (1, 2) the sample values $A_k$ and $B_k$ by the sample values $A_{k+1}$ and $B_{k+1}$ in said registers for storing the current values in order to begin a further cycle of calculation; and initialization means (13, 14) providing an input to said primary calculation means for ensuring that the amplitude of the starting values $A_o$ and $B_o$ is greater than 0 and not greater than $R\sqrt{5}$.

4. A generator according to claim 3, wherein the initialization means sets one of $A_o$ and $B_o$ to R and the other to zero.

5. A generator according to claim 3, wherein the multiplying/dividing means comprising:

means for squaring (18, 19) the approximate values to obtain $A'^2_{k+1}$ and $B'^2_{k+1}$;
said adding/subtracting means comprising means for summing the said squares (15) to obtain $(A'^2_{k+1} + B'^2_{k+1})$,
means for subtracting (16) the sum of the squares from $R^2$, to obtain $R^2 - (A'^2_{k+1} + B'^2_{k+1})$;

said multiplying/dividing means further comprising means for halving (24) the difference thus obtained to obtain $$\frac{1}{2}R^2 - \frac{1}{2}(A'^2_{k+1} + B'^2_{k+1});$$

said adding/subtracting means further comprising means for adding the halved difference to $R^2$ to obtain $$\frac{3}{2}R^2 - \frac{1}{2}(A'^2_{k+1} + B'^2_{k+1}), \text{ and}$$

said multiplying/dividing means further comprising means for multiplying by $1/R^2$ to obtain $$\frac{3}{2} - \frac{1}{2R^2}(A'^2_{k+1} + B'^2_{k+1})$$

$$= 1 + \frac{1}{2} - 1/2 \cdot \frac{1}{R^2}(A'^2_{k+1} + B'^2_{k+1})$$

$$= 1[-\frac{1}{2}] - 1/2\left\{\frac{1}{R^2}(A'^2_{k+1} + B'^2_{k+1}) - 1\right\}$$

$$= 1 - \frac{1}{2}\epsilon_{k+1}.$$

6. A generator according to claim 3, wherein the value of R is chosen to be unity.

7. A generator according to claim 3, wherein the primary calculation means, the correction factor calculation means and the multiplication means are all constituted by a single, program-controlled processor, which performs all the said operations sequentially within each period T.

8. A generator according to claim 3, wherein the period T corresponds to a sampling frequency of not less than 4,800 Hz.

9. A generator according to claim 3, wherein calculations are performed in binary using 16 bit two's complement arithmetic.

* * * * *